March 20, 1973  H. L. KINDORF  3,721,412
LOCKING WIRE CINCH STRAP
Filed April 9, 1971  2 Sheets-Sheet 2
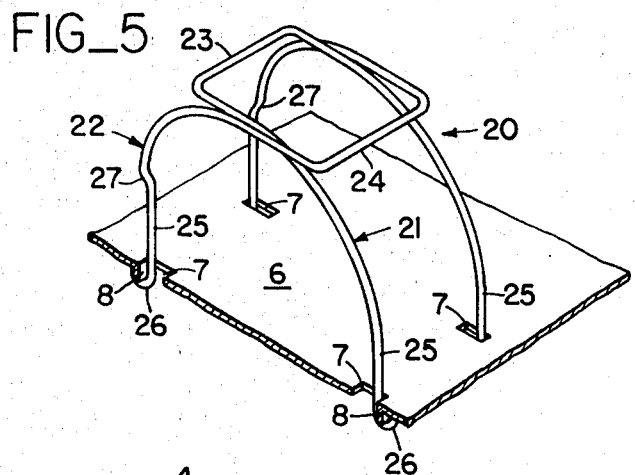
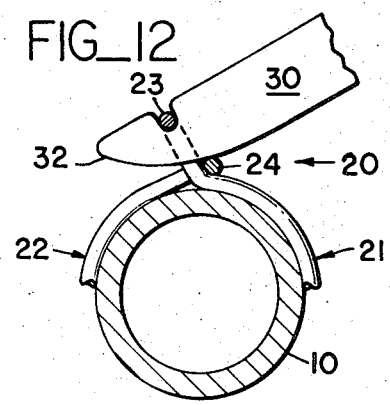
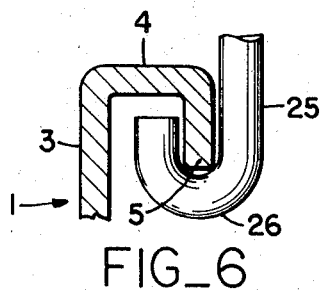
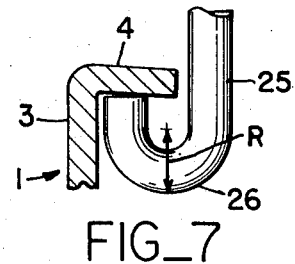
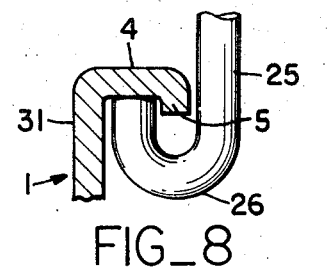
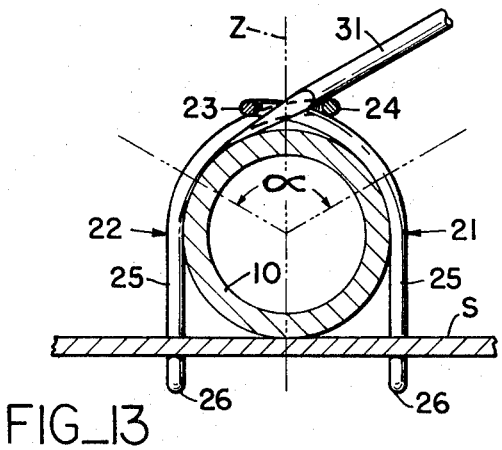
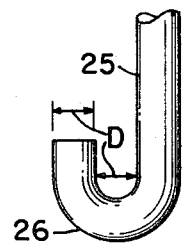
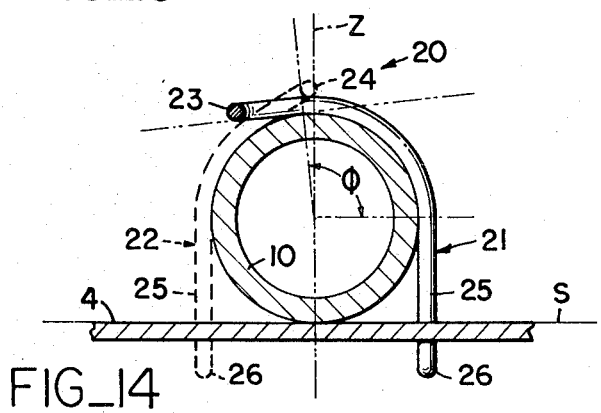
INVENTOR.
HARRY L. KINDORF
BY
ATTORNEYS

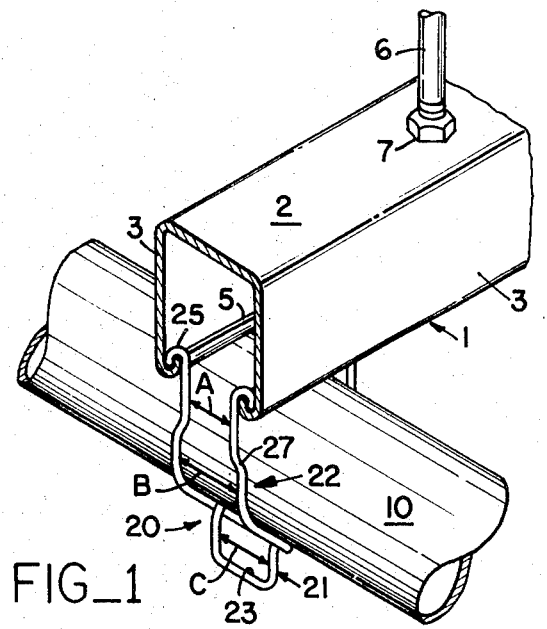
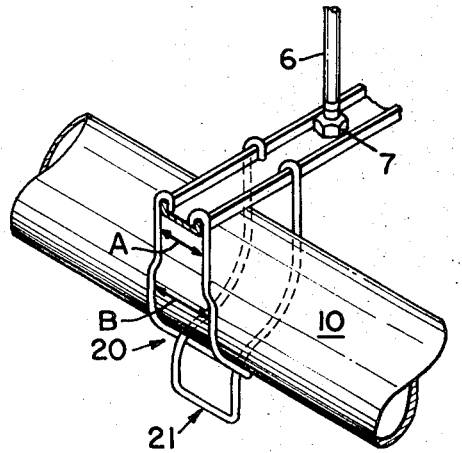
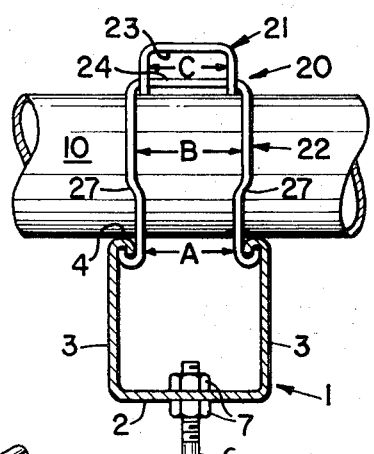
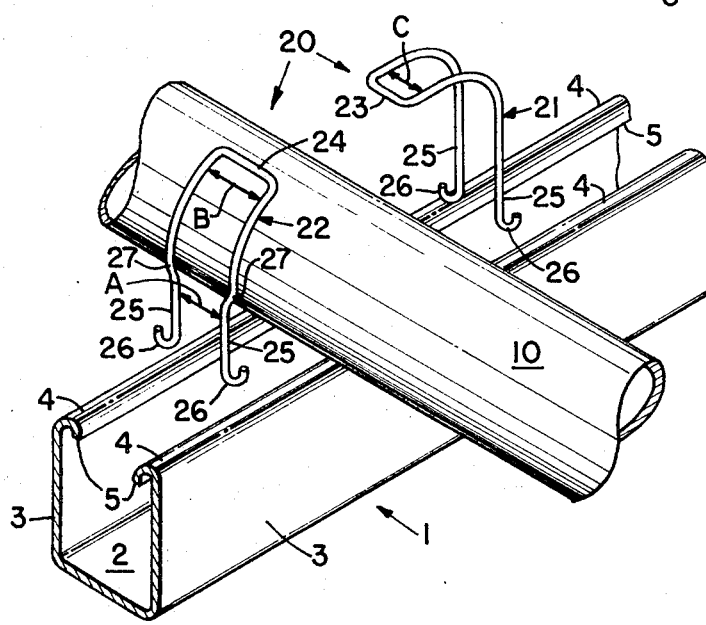

United States Patent Office 3,721,412
Patented Mar. 20, 1973

3,721,412
LOCKING WIRE CINCH STRAP
Harry L. Kindorf, 385 Fairmont Ave.,
Oakland, Calif. 94611
Filed Apr. 9, 1971, Ser. No. 132,774
Int. Cl. F16l 3/04
U.S. Cl. 248—73
8 Claims

ABSTRACT OF THE DISCLOSURE

A pair of curved U-shaped wire members with hooks on their distal ends cooperate to form a wire strap that has its members secured to a cooperating support through their hooks and interengaged around a conduit contiguous to the support by threading the loop end of the male U-shaped member through the wider loop end of the female U-shaped member of the pair, thereafter tightening the lapped ends of the U-shaped members about the conduit by applying pressure between these ends and subsequently locking the members by bending the loop end of the male member away from the conduit so it wraps about the loop end of the female U-shaped member, thereby cinching the conduit to the support with the two piece wire strap.

BACKGROUND OF THE INVENTION

Conduit as used herein shall be inclusive of generally circular members such as wires, cables, pipes, tubes, shrouds, etc., which are often mechanically attached to supporting structures with clamping devices. Typical installations of such conduits are the electrical conduits and service pipes for gas, water, air, etc., found in commercial buildings, on ships, or other similar installation where often groups of such conduits are secured to supports.

Typically, the supports to which these conduits are attached often are U-shaped channels that are structurally supported by a building, ship or machine. By rolling the edges of these channels inwardly, opposed flanges are formed on opposite sides of the channel through which various conventional clamps and/or straps can be coupled for securing such conduits to these channels. U.S. Pats. 3,486,726 and 3,463,428, issued to Kindorf et al., aptly illustrate the several types of U-shaped channels employed as well as several prior art clamping devices.

Perusal of the specification and drawings of the referenced Kindorf patents will show that a number of different types of commercially available U-shaped channels are often employed which have considerable variations in the design of the rolled edges that form the opposed flanges.

The width connecting portion of the strap device received in such channel is generally critical where it engages the flanges, as illustrated in U.S. Pat. 3,486,726, since if the connecting portion is too wide the strap will not orient properly within the channel and if too narrow it will not sufficiently lap both flanges to ensure a sound mechanical engagement with both flanges. Utilizing the narrower strap or halp strap, shown in U.S. Pat. 3,463,428, avoids some of the problems with U-shaped channels having varying widths, but at the expense of some of the mechanical integrity of the resulting attachment to the channel member since only one of the flanges is engaged by this strap. Further, the half strap can be improperly engaged with the single flange when installed if the flange is not fully inserted in the notches, often leading to a conduit attachment which will subsequently fail due to mechanical loads or vibration.

In general it can be appreciated that the straps or clamps referred to above as well as others found in the prior art are only compatible with a limited number or types of support members, often being tailored to fit particular flange arrangements, width of channel or a slight variation thereof.

Also typical of prior art straps or clamps, the two straps illustrated in the referenced Kindorf patents employ a bolt and nut securing the several arcuate halves of the straps together. Thus to assemble the strap illustrated in U.S. Pat. 3,486,726 with a cooperating U-shaped channel, the strap must be disassembled requiring the installer to handle the nut and bolt, often under very inconvenient circumstances. Thereafter, this strap when subsequently reassembled around the conduit must be tightened by turning the bolt with a screwdriver or wrench to complete the attachment of the conduit to the support. Such tightening is also required with the half strap shown in U.S. Pat. 3,463,428 when it is engaged with a conduit and U-shaped channel. This tightening step is often time-consuming and arduous, increasing installation costs. Further the bolts and nuts used in these types of straps are, by comparison, very expensive parts of the straps, and must be assembled with the strap parts during manufacture to complete the strap.

To overcome some of the difficulties experienced with prior art straps, such as those previously mentioned, the instant invention has an object to provide an inexpensive wire cinch clamp which is easier to install.

Another object of the current invention is the provision of the wire cinch clamp which is compatible with a wide variety of differing support structures which are employed to support various conduits.

Still another object is the provision of a simple wire strap design of fewer parts.

Many other objects and advantages will be apparent from the drawings and the following description of the invention and no limitation on the invention or its advantages is intended by the above identification of several of its more important advantages.

SUMMARY OF THE INVENTION

The above objects and advantages can be accomplished with a lockable wire cinch strap comprising a pair of arcuate U-shaped wire members, each having a loop end with connecting spaced apart legs forming sides of its U-shape, one of said members having a wider loop end forming a female half of the clamp, said other of said members having a smaller loop end forming the male half, said smaller loop end adapted to pass through said loop end of said female half of said strap, and hook means on the distal ends of said legs adapted to engage cooperating attaching means of a support whereby a conduit contiguous to said support can be secured thereon by engaging said hook means with its attaching means and interengaging said halves about the conduit by passing said loop end of said male half through the loop end of said female half, tightening said halves about the conduit by forcing their respective loop ends apart and subsequently bending said loop end of said male half outwardly from conduit to wrap it around said loop end of said female member and cinch said conduit to said support.

BRIEF DESCRIPTION OF THE DRAWINGS

FIG. 1 is a top perspective of a conduit secured to a U-shaped channel with a preferred embodiment of the wire cinch clamp, the latter shown in its locked position;

FIG. 2 is an elevation of the perspective shown in FIG. 1 turned upside down for viewing convenience;

FIG. 3 is an exploded perspective of the two halves of the cinch strap adjacent to a U-shaped channel and conduit indicating how it is assembled with the channel and conduit;

FIG. 4 is a top perspective showing a simple hook modification of the wire cinch strap securing a conduit to an inverted edge ribbed channel;

FIG. 5 is a broken-away perspective illustrating the cinch strap coupled to a punched plate support;

FIGS. 6, 7 and 8 illustrate, in broken-away section, different types of attaching engagements which can be accomplished with the hooks at the ends of the legs of the wire cinch strap;

FIGS. 9, 10 and 11 are illustrative sections of the various cross-sectional configurations of the wire material from which the several halves of the cinch strap can be formed;

FIGS. 12 and 13 are broken-away elevations illustrating the tightening and locking steps utilized when the new cinch strap is employed;

FIG. 14 is an elevation illustrating an embodiment of the wire cinch strap with an over-center locking male half; and FIG. 15 is a broken-away elevation of one of the hooks of the halves illustrating the hook construction in detail.

BRIEF DESCRIPTION OF A PREFERRED EMBODIMENT

FIGS. 1, 2 and 3 illustrate one of the more preferred embodiments of the cinch strap 20, associated with a U-shaped channel 1 having a base 2 and perpendicular channel walls 3 joined on opposite sides of the base with the edges of the channel walls rolled over to form inwardly projecting flanges 4 on opposite sides, that may include an angularly extending lip 5 that projects towards the base of the channel, in some channel embodiments. For an illustration of several different types of U-shaped channels described with respect to their flange constructions reference is made to FIGS. 6, 7 and 8.

Hanger bolts 6 with accompanying nuts 7 are often employed to suspend the U-shaped channel 1 from walls, ceilings or floors of typical installations as illustrated in FIGS. 1–4, and only a single conduit 10 is shown being attached to these channel supports since it is adequate for illustrating the invention. However, it to be appreciated that numerous conduits usually are supported on the same U-shaped member in closely spaced, parallel relationship.

The several arcuate U-shaped wire members forming the wire cinch clamp or strap 20 include a male half 21 and a female half 22, formed so the width C of the loop end 23 of the male half will pass through the wider loop end 24 of the female half, the latter's inner width B being slightly greater than outer width C of the male half. Each half's loop end has a pair of equal length wire legs which are generally parallel and formed with matching curves in their central portions having an inner radius approximating the outer radius of conduit 10 to be connected to a cooperating support with the new wire strap.

It is generally preferred that the wire straps be sized for a particular conduit diameter since a better structural attachment with the supporting structure will be achieved. This is particularly true for larger sized conduits wherein considerable force would be required to conform the heavy gauge wire structures of the cinch strap to the outer engaged surfaces of the conduit when the strap is tightened just prior to locking it, if it was not sized properly. There is, however, some latitude in sizing the curves in the respective halves of the wire cinch strap since tightening the two halves will accommodate minor variations even though hevay gauge wire or material is involved in the construction of the strap. Some difficulties with the small size wire cinch straps, for conduits under one-half inch, occur if they are not sized carefully.

At the distal end of each leg 25 is a hook 26 which is formed by bending the wire end about a small radius to reverse its direction approximately 180 degrees as illustrated in the drawings, so it has an appearance similar to that of a fishhook. In FIG. 15 the preferred construction of the hooks is illustrated, with the diameter D of the wire equal to the curvature's diameter in the bend. This will form a stronger and more serviceable hook. Since the legs on each half of the wire cinch strap are equal, the hooks are the same distance from the loop end of their associated half.

As indicated, the hooks 26 are formed about a small radius and therefore have adequate mechanical strength to secure their half of the wire cinch clamp to an appropriate support. In FIGS. 6, 7 and 8, various alternative engagements of the hooks with different types of U-shaped channel members 1 are illustrated. Lip 5 of flange 4 in FIG. 6 is received in the inner radius area of the hook because of the length of the lip, whereas the tip of the hook engages the underside of flanges 4 of the channels illustrated in FIGS. 7 and 8. It must also be appreciated that the tip of the hooks tend to bite into the engaged area of an associated channel member when the cinch clamp is tightened which prevents any sliding movement of the hooks on the channel after the strap has been locked. Normally the orientation planes of the hooks on the legs of each half of the wire strap will be in a common plane but rotated 180 degrees with respect to one another, as illustrated in FIGS. 1, 2, 3 and 4. In FIG. 5, however, the hooks on each half of the wire strap have the same orientation in spaced apart parallel planes due to accommodation of their hooks on plate 6 which has been blanked to form slots 7 and downwardly projecting lugs 8 which prevent the books 26 from slipping back into the slots after the strap has been assembled with the plate and an associated conduit (not shown).

Because of the U-shaped construction of the two halves of the wire cinch clamp 20, the legs 25 of both the male half 21 and the female half 22 may be forced together or apart to facilitate assembly on cooperating support members. Normally the legs of both halves will be the same distance apart near their respective hooks, which is designated as distance A in the drawings, since in the hook areas the legs of both halves engage the same flanges. Since distance A for each half can be adjusted, within limits, the strap is compatible with U-shaped channels of differing widths, with no loss in mechanical integrity of the resulting attachment. Further the insertion of the several halves with channels in tight or limited working spaces is facilitated since the halves do not have to be twisted or turned to insert them in the channel opening. In addition registry with slots 7 of plate 6 in the straps alternate embodiment (see FIG. 5) is easily achieved by slight adjustment of distance A as the halves are connected with the plate. Thus, due to the hook construction and the ability to vary the distance between the legs of the several halves of the wire cinch strap it is compatible with a large number of different types of cooperating supports.

As indicated above, it is desirable to have the distance A identically adjacent to the hooks 26 on both the male and female halves, 21 and 22 respectively, of the wire cinch clamp. Therefore the female half is generally provided with an offset 27 in each of its legs 25 so that the loop end 23 of the male half will freely pass through its loop end 24 without interference. Each offset is approximately equal to the diameter of the wire forming the cinch strap and is located in the central portion of the legs, usually just below its point of contact with the conduit 10 in the area of hooks 26.

The construction of the male half 21 of the wire cinch clamp 20 is only slightly different than the construction of the female half 22, but generally has somewhat longer legs 25 so that its loop end 23 can be easily received through the loop end 24 of the female half when the two are interengaged about a conduit 10. However, since the interengaged looped ends of the two halves can be tightened and locked in various circumferential locations about the conduit, where they are supported underneath by the conduit, the length of their respective legs can vary. Normally the loop end of the female half of the clamp should be within a 90 degrees quadrant, designated α in FIG. 13, remote from the cooperating support, which quadrant is bisected by a plane Z passing through the longitudinal axis of the conduit and normal to the support plane S of the cooperating support. Generally however, it is preferred that the male half of a strap be the longer of the two since this facilitates assembly to some extent when the male member is assembled on the channel because it can be sprung slightly to pass over the conduit after it has been coupled with the channel forming a fully supporting crade for the conduit with the male half which facilitates subsequent assembling of the female half therewith. In FIG. 14 the cradling feature is illustrated and as can be seen the curved portions of the spaced apart legs 25 embrace a top quadrant of the conduit 10 which slightly exceeds 90 degrees represented by angle φ in the drawings. The loop end 23 extends tangentially and with the curved legs form a simple over-center lock on the conduit when assembled therewith.

FIGS. 12 and 13 illustrate how the wire cinch strap 20 is locked with various devices, such as a special wrench 30 or a common screwdriver 31. When using either tool shown in these figures the loop ends 23 and 24, respectively, of the two halves of the wire cinch strap are forced apart by the tool through a wedging action and thereafter using loop end 24 as a fulcrum, the loop end 23 is bent outwardly away from the conduit. Tool 30 has an arcuate surface 32 which automatically wedges the loop ends apart as it is cammed in a direction to lock these ends as previously described. The screwdriver employs a three-point contact between the several loop ends and the outer surface of the conduit 10 to effect a wedging action to spread the two ends, following by a downward motion of its handle to swing the loop end of the male away from the conduit and lock the cinch clamp.

It can be appreciated from these discussions that the cinch clamp once interengaged around the conduit and attached to the channel through its hooks can be quickly and conveniently tightened and locked almost with a single motion. The male half is pulled through the female half until the surface halves conform to the top outer surface of the conduit thereby achieving a tight engagement just prior to locking which actually slightly increases the pressure due to the camming action which occurs as the male end is bent away from the conduit.

While the above description and drawings have illustrated the wire cinch strap as formed of wire of circular cross-section, it should be appreciated that its cross-section could vary from square to oval as is illustrated in FIGS. 9, 10 and 11. The actual cross-section of the material used to form the wire cinch clamp is not critical.

Ten gauge wire (0.135 inch) has been employed to form wire cinch straps in sizes for conduits having outside diameters from one-half inch to four and one-half inches with good results. Larger size conduits will require heavier gauge wire or material.

It should also be appreciated that as the wire cinch strap is tightened it is slightly spring loaded as the wire conforms to the surface of the conduit and a slight deflection occurs in the area of the hooks. As a result the cinch strap can accommodate thermal expansions and contractions of the conduit without loosening its cinching grip thereon.

Generally the hooks 26 are formed with a small radius R to obtain the maximum strength in the areas of the hooks which have an inner radius equal to the radius of the wire when it is circular in cross section. This usually provides a good "match" between the hooks and supporting channel members (see FIGS. 6, 7 and 8) so various couples or attachments can be accomplished as illustrated in the drawings.

What is claimed is:
1. A lockable cinch strap comprising:
 a pair of U-shaped members, each of said U-shaped members having a loop end and two spaced apart legs depending from its loop end, one of said U-shaped members which forms a female half of said strap having a wider loop end adapted to receive therethrough said loop end of said other U-shaped member which forms a male half of said strap; and
 separate hook means at the distal ends of each of said spaced-apart legs of each of said halves adapted to engage contiguous support structures when said male half is assembled with said female half about a conduit to be secured by said strap to said support when the former is tightened as said loop end of said male half is bent away from said conduit, said hook being bent so each has a distal end portion which is substantially parallel with its associated leg and each of said hooks having a bend, radius approximating an average radius of its associated leg.
2. The lockable cinch strap defined in claim 1 wherein the central portions of the legs of each U-shaped member are curved to match the outer contour of a conduit to be secured thereby and wherein the hooks of each U-shaped member are oriented in a common plane passing centrally through said hooks and their associated legs.
3. The lockable cinch strap described in claim 1 wherein the U-shaped members are fabricated from wire materials formed to a U-shape.
4. The lockable cinch strap defined in claim 3 wherein the hook means at the distal ends of the legs are formed by bending an end portion about a small radius to form a hook, said resulting hooks being oriented in parallel planes when the male and female halves of the strap are assembled on a conduit.
5. The lockable cinch strap defined in claim 2 wherein the male half of the strap has longer legs whereby it can encircle a larger segment of a conduit to be secured thereby so as to form a supporting sling for said conduit when it is connected to an overhead support without the female half.
6. The lockable cinch strap defined in claim 1 wherein the loop end of the female half includes a straight central portion which is oriented parallel to the longitudinal axis of a conduit secured thereby.
7. The lockable cinch strap defined in claim 6 wherein the legs of the female half are of a length so its straight central portion will be located on a portion of a conduit remote from the support structures to which its hook means are attached when it is assembled with said conduit and the male half.
8. The lockable cinch strap defined in claim 3 wherein the spaced apart legs of the male and female halves have equal distances between their respective hook means and said female half has an outward offset in each leg to provide its wider loop end.

References Cited

UNITED STATES PATENTS

| | | | |
|---|---|---|---|
| 2,864,575 | 12/1958 | Stewart | 248—302 X |
| 2,479,115 | 7/1949 | Inman | 248—303 X |
| 3,521,842 | 7/1970 | Opperhauser | 248—302 X |

FOREIGN PATENTS

| | | | |
|---|---|---|---|
| 480,455 | 4/1953 | Italy | 24—283 |

MARION PARSONS, Jr., Primary Examiner

U.S. Cl. X.R.

24—283; 248—303